(12) United States Patent
Aubert et al.

(10) Patent No.: US 7,620,891 B2
(45) Date of Patent: Nov. 17, 2009

(54) METHOD AND SYSTEM FOR IMPROVING PRESENTATION OF HTML PAGES IN WEB DEVICES

(75) Inventors: Denis Aubert, Saint Paul de Vence (FR); Franck Boudinet, Villeneuve Loubet (FR); Philippe Favre, Villeneuve Loubet (FR); Eric Forestier, Vence (FR); Bernard Dakar, Saint Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 10/562,020

(22) PCT Filed: May 6, 2004

(86) PCT No.: PCT/EP2004/050721

§ 371 (c)(1),
(2), (4) Date: Apr. 18, 2006

(87) PCT Pub. No.: WO2005/003998

PCT Pub. Date: Jan. 13, 2005

(65) Prior Publication Data

US 2006/0236223 A1 Oct. 19, 2006

(30) Foreign Application Priority Data

Jun. 30, 2003 (EP) .................... 03368064

(51) Int. Cl.
*G06F 17/00* (2006.01)
(52) U.S. Cl. .................. 715/236; 715/234; 715/248; 715/249
(58) Field of Classification Search ............... 715/248, 715/249, 234, 236
See application file for complete search history.

(56) References Cited

U.S. PATENT DOCUMENTS 5,860,073 A * 1/1999 Ferrel et al. ................ 715/255

(Continued)

FOREIGN PATENT DOCUMENTS

| GB | 2366037 A | 2/2002 |
| TW | 090124215 | 3/2003 |

OTHER PUBLICATIONS

Borning, et al., "Constraint-based document layout for the Web", Multimedia Systems, vol. 8, No. 3, Oct. 2000, p. 177-189.*
Reynolds et al., "Composite Capability/Preference Profiles (CC/PP): A user side framework for content negotiation", W3C Note, Jul. 27, 1999.
Raggett et al., "HTML 4.01 Specification", W3C Recommendation, Dec. 24, 1999.

(Continued)

*Primary Examiner*—Amelia Rutledge
(74) *Attorney, Agent, or Firm*—Norman Gundel; Hoffman Warnick LLC (57) ABSTRACT

A method and system are disclosed for allowing a device using a Web browser unable to support CSS, to request trough a network and display Web HTML pages including CSS while using all the presentation features of the included CSS that it can support through the network, said method comprising the steps of: receiving a request from the device for obtaining a Web HTML page; identifying the requesting device, aggregating all the device and network display possibility information, and suppressing the contradictory information, the network display possibilities being of the highest priority, the result forming a Request rule list; retrieving the requested Web page from a Web server; aggregating all the CSS presentation definitions of the Web page while suppressing the conflicting ones in a resulting CSS rule list; modifying the statements of the HTML page which are not related to CSS, reflecting the CSS rule list while taking into account the device and network possibilities as stated in the Request rule list; transmitting to the device the HTML page comprising the modified statements. The method is executed on a network component which may be a proxy server or a router with computing capabilities.

17 Claims, 7 Drawing Sheets

U.S. PATENT DOCUMENTS

| | | | |
|---|---|---|---|
| 6,023,714 A * | 2/2000 | Hill et al. | 715/235 |
| 6,565,609 B1 * | 5/2003 | Sorge et al. | 715/234 |
| 7,299,411 B2 * | 11/2007 | Blair et al. | 715/243 |
| 2002/0035579 A1 * | 3/2002 | Wang et al. | 707/513 |
| 2003/0037076 A1 * | 2/2003 | Bravery et al. | 707/517 |

OTHER PUBLICATIONS

Ma et al., "A framework for adaptive content delivery in heterogeneous network environments", Hewlett-Packard Laboratories, 15 pages.

* cited by examiner

Network preference repository

NetworkName=wireless
unsupportedExtensions=[wav, rmi, swf, mid, mpg]
unsupportedImages=[pdb, iff, img, lbm, mac, msp,
    pbm, pct, pcx, pgm, pic, png, ppm, psd,
    ras, raw, rle, tga, tif, wmf, wpg, bmp]
textLinksPreferredToImages=true
disposeImages=false
transcodeImages=true
compressSource=true
ImageSizeQualityTradeoff{comboBox(compromise,
favorHighQuality,favorSmallSize)}

FIGURE 4

Device preference repository

DeviceName=PocketPC
compressSource=false
unsupportedExtensions=[rmi, swf, mid, mpg]
unsupportedImages=[pdb, iff, img, lbm, mac, msp, pbm, pct, pcx, pgm, pic, ppm, psd, ras, raw, rle, tga, tif, wmf, wpg]
javaScriptSupported=true
javaAppletsSupported=false
framesSupported=true
deviceType=WinCE/PocketIE2.0
ObjectsSupported=false
desiredContentTypes=[text/html]
desiredDocumentTypeDefinitions=[]
cascadingStyleSheetsSupported=false
clientSideImageMapsSupported=true
supportedImages=[gif, jpg]
colorSupported=true
screenCapability=intermediate
deviceRule=User_Agent=*Windows CE*

FIGURE 5

Device capability repository

DeviceName=PocketPC
transcodeImages=true
disposeImages=false
stdScreenPixels=1024x768
fixedImageScale=false
imageScaleFactor=0.5
textLinksPreferredToImages=false
convertTablesToUnorderedLists=false

FIGURE 6

Request rule list cascadingStyleSheetsSupported=false
clientSideImageMapsSupported=true
colorSupported=true
compressSource=false
compressSource=true
convertTablesToUnorderedLists=false
desiredContentTypes=[text/html]
desiredDocumentTypeDefinitions=[]
deviceRule=User_Agent=*Windows CE*
deviceType=WinCE/PocketIE2.0
disposeImages=false
fixedImageScale=false
framesSupported=true
imageScaleFactor=0.5
ImageSizeQualityTradeoff{comboBox(compromise,favorHigh
    Quality,favorSmallSize)}
javaAppletsSupported=false
javaScriptSupported=true
ObjectsSupported=false
screenCapability=intermediate
stdScreenPixels=1024x768
supportedImages=[gif, jpg]
textLinksPreferredToImages=true
transcodeImages=true
unsupportedExtensions=[wav, rmi, swf, mid, mpg]
unsupportedImages=[pdb, iff, img, lbm, mac, msp, pbm, pct, pcx,
    pgm, pic, png, ppm, psd, ras, raw, rle, tga, tif, wmf, wpg, bmp]

FIGURE 7

METHOD AND SYSTEM FOR IMPROVING PRESENTATION OF HTML PAGES IN WEB DEVICES

The present invention relates to the field of HTML V4 pages displayed on Web devices such as Personal Data Assistants (PDAs), unable to support Cascading StyleSheets (CSS).

BACKGROUND OF THE INVENTION

The Web devices such as PDAs, packet PCs and mobile phones supporting HTML have however limitations in the presentation of HTML pages displayed on their screen. The limitation originally comes from the limitation of the Web device capacity, such as limitation in memory size, display attributer or limitation of the bandwidth in the mobile networks.

In order to improve presentation of the HTML pages displayed on the web device, the standardized HTML V4 proposes support for Cascading Style Sheet (CSS). The browser supporting CSS interprets link statements in of HTML V4 pages pointing to hyperlinks containing a description of the page presentation using advanced displaying capabilities such as color, line height etc. As an alternative to the link statement, the presentation stylesheet may be imbedded in the HTML page. The standard organizations such as W3C strongly push for the use of CSS in order to relieve the HTML language from the responsibilities of presentation. A description of CSS level 1 referred as REC-CSS1-19990111 is described for example in the W3C recommendation of 17 Dec. 1996; revised June January 1999.

In parallel to the evolution of HTML methodology, the Web devices themselves have increased their presentation capabilities. Unfortunately, not all of their browser support the CSS of HTML V4. The browser of some web devices do not support CSS. They only support up to HTML V3.2, as described in the HTML 3.2 Reference specification REC-html32, a W3C recommendation of 14 Jan. 1997. A web device browser supporting up to HTML 3.2 can read a HTML V4 page by skipping the link statements and the imbedded CSS. Consequently even when the web device has the hardware and software capabilities for advanced text presentation, as the browser cannot use the CSS, the presentation features of the CSS, the HTML page presentation features displayed by such web devices remain basic and not satisfying. Furthermore, the problem of the limited presentation feature may have an impact of the functionalities of web applications. For instance, functional push buttons of web pages may only be visible through advanced presentation features and thus cannot be activated is the CSS is not understood by the browser.

One example of web device having advanced presentation capabilities but operating a browser supporting web pages up to HTML V3.2 only is the Nokia 9110 mobile phone, the limitations of the browser being described in the Nokia 9110 Communicator Browser Style Guide book, a brochure published on 21 Apr. 1999.

One solution to this problem is to develop browser on these web devices which would support the CSS of HTML V4. The cost of development and distribution of dedicated browsers may prevent the device manufacturers from upgrading the browsers. One other reason preventing the web device manufacturers from handling such developments is the fact that some devices have improved presentation capabilities but not for all the features assumed to be supported by HTML V4 CSS specificities. This would imply to develop a browser very specific to the web device and which would need further upgrade with the growing device presentation capabilities.

There is thus a need to use current web devices including operating a browser supporting HTML web pages up to HTML 3.2, to be able to take advantage of their inherent advanced device presentation capabilities when displaying HTML V4 web pages including CSS.

SUMMARY OF THE INVENTION

It is an object of the present invention to provide a way to optimize the presentation of a the HTML V4 pages on a web device operating a browser up to level 3.2 compared to the presentation features in HTML V3.2 pages.

It is a second object of the invention to optimize the HTML V4 page presentation to the maximum of the display capabilities inherent to the web device itself.

These objects are reached by the use of a method for allowing a device using a Web browser unable to support CSS, to request trough a network and display Web HTML pages including CSS while using all the presentation features of the included CSS that it can support through the network, said method comprising the steps of: receiving a request from the device for obtaining a Web HTML page; identifying the requesting device, aggregating all the device and network display possibility information, and suppressing the contradictory information, the network display possibilities being of the highest priority, the result forming a Request rule list; retrieving the requested Web page from a Web server; aggregating all the CSS presentation definitions of the Web page while suppressing the conflicting ones in a resulting CSS rule list; modifying the statements of the HTML page which are not related to CSS, reflecting the CSS rule list while taking into account the device and network possibilities as stated in the Request rule list; transmitting to the device the HTML page comprising the modified statements. The method is executed on a network component which may be a proxy server or a router with computing capabilities.

These objects are also reached when the method is executed by a program installed on network component which can be a proxy server or a router or switch having computing capabilities.

With the solution of the invention, there is no need to modify the browser or any part of the device, this solution is very useful to support very quickly a broad scope of devices having browsers which do not support CSS.

An advantage of the solution of the present invention is to provide a simple solution implemented as a program operating on a component of the network. The solution is simple to install, can adapt to all kind of devices and only uses information about connected devices and the network which are public information respectively made available by the Web device manufacturers and the network carriers.

The network component can also be used for other centralized operations such as billing or security or any other added value function. Furthermore, the solution can be implemented on an existing component of the network shared by many customers for other centralized applications.

DETAILED DESCRIPTION OF THE PREFERRED EMBODIMENT

Figure 1:
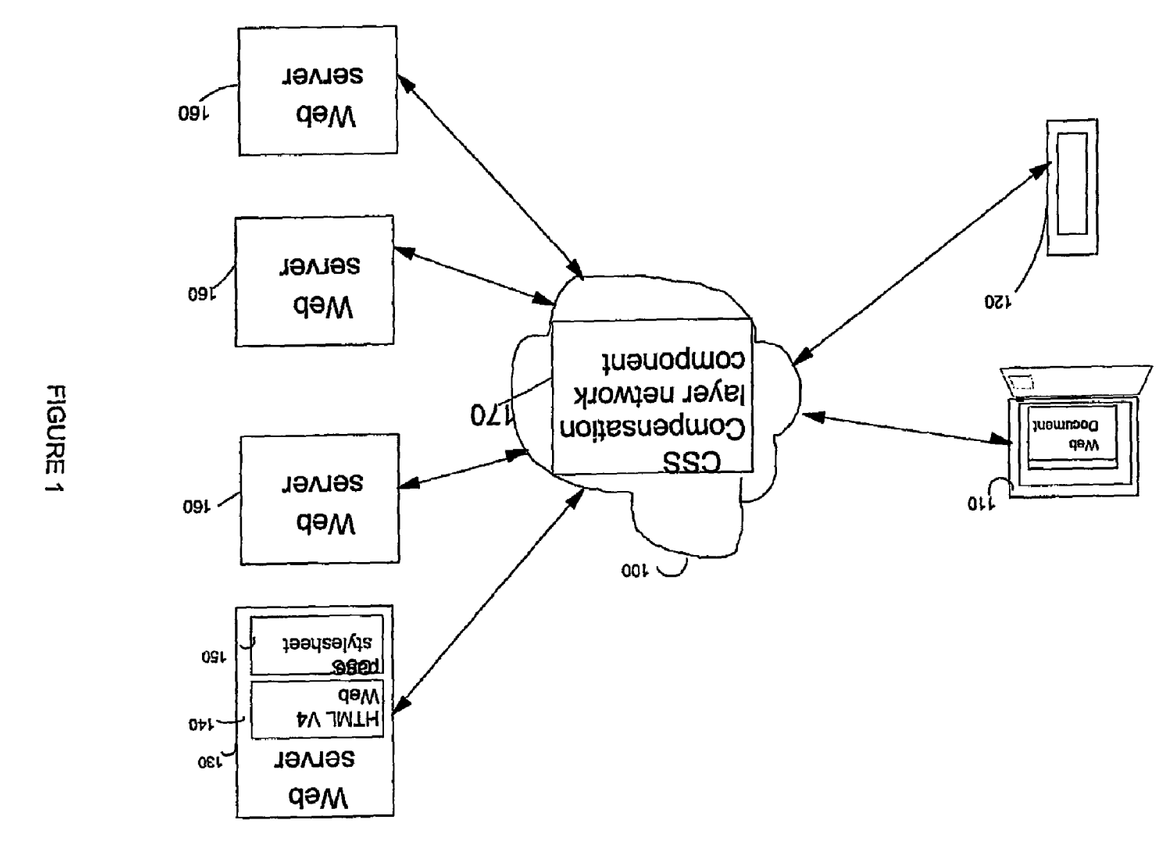
FIG. 1 is a system view in which is carried out the solution according to the preferred embodiment.

In FIG. 1 is shown the operating environment of the solution according to the preferred embodiment. Web devices such as a PDA (120) or a thin PC (110) access Web servers (130) through a Web network (100). The Web devices display the Web pages read on the Web servers user their Web browser. The protocol known today to request the Web pages is HTTP or HTTPS; the Web devices send HTTP or HTTPS requests toward the Web server address to get the Web pages. In the Web server (130) of FIG. 1 the Web pages implement HTML V4 which includes the Cascading Style Sheet (CSS) feature. The HTML V4 Web pages consist in two different files (140, 150). A first (140) file includes HTML statements and some 'Link' statements providing an URL toward a second file (150), an external CSS stylesheet. It is noted that some CSS stylesheet link may point to other CSS stylesheet files stored on different Web servers (160). The CSS Stylesheet files describe a presentation which can be displayed only by a browser supporting HTML V4. In FIG. 1, the Web devices (110, 120) support up to HTML 3.2 only. Such devices having browsers not supporting CSS are the Pocket IE till Pocket PC 2002, the Palm pilot Web browsers, NOKIA 9110, Minitel devices and all the computing equipment having Internet Explorer and Netscape Navigator version older than V4 installed. These browsers receiving from the Web server the HTML V4 Web page only interprets the first file (140) and skips the Link statements. When the CSS are imbedded in the statements of the HTML V4 pages, the embedded CSS description is also skipped by the HTML V3.2 browser. Hereunder is one example of HTML V4 page statements with including two 'link' statements pointing to external CSS files indicated with their address:

```
<html>
<link rel="stylesheet" type="text/css"
ref="/common/v6/css/w3_common.css" />
<link rel="stylesheet" type="text/css"
href="/common/v6/css/w3_netscape.css" />
<body>
<h1>This is header 1</h1>
<h2>This is header 2</h2>
<p>This is a paragraph</p>
</body>
</html>
```

The following is an example of HTML V4 statements using an embedded CSS between two 'style' statements:

```
<html>
<head>
<style type="text/css">
h1 {color: #00ff00}
h2 {color: #dda0dd}
p {color: rgb(0,0,255)}
</style>
```

```
</head>
<body>
<h1>This is header 1</h1>
<h2>This is header 2</h2>
<p>This is a paragraph</p>
</body>
</html>
```

As described in FIG. 1, with the solution of the preferred embodiment, a program is installed on a CSS compensation layer component of the Web network (170). The program using the HTTP requests sent by the Web devices, collects the two file HTML V4 Web pages, collects the other CSS stylesheet files on the other Web servers if necessary, and sends back to the Web devices newly created Web pages, displayable by a browser supporting up to HTML V3.2 Web pages, having displaying attributes reflecting at the best the presentation characteristics as they were presented in the initial HTML V4 Web page CSS Stylesheet files. The CSS compensation layer Web network component can be a proxy server of a sophisticated router having programming means capacity able to implement the program according to the preferred embodiment.

Figure 2:
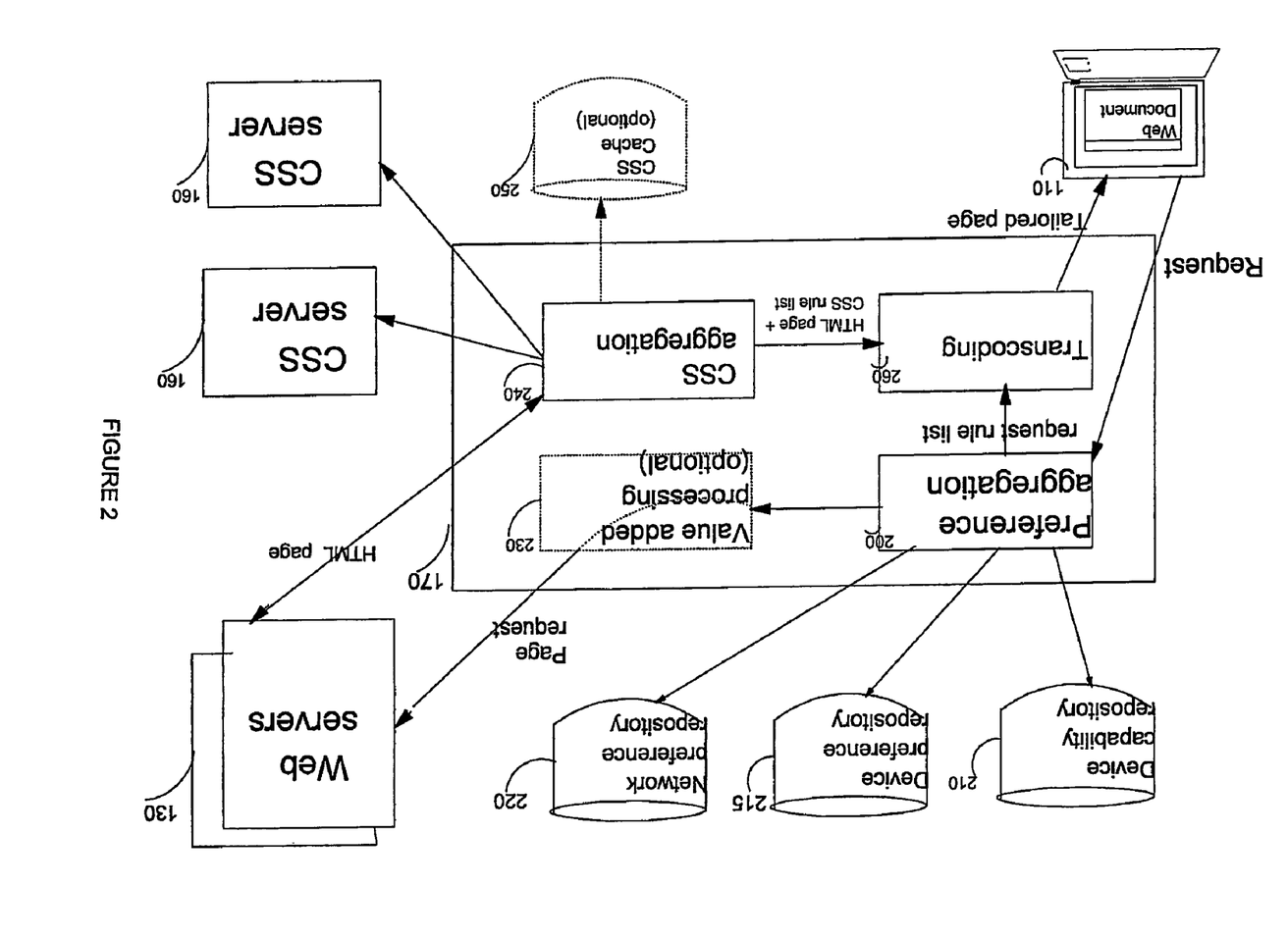
FIG. 2 illustrates the logical blocks constituting the program operating on the CSS compensation layer network component according to the preferred embodiment.

FIG. 2 illustrates the logical blocks constituting the CSS proxy program operating on the CSS compensation layer network component (170) according to the preferred embodiment. This 'CSS proxy' acts as a 'distributed plugin' of the client device Web browser. This may be realized using servlet 3.2 filters, HTTP proxy plugins or WBI Megs. For instance, to create this program, one can use the external annotation facility of IBM Websphere Transcoding Publisher.

The CSS proxy intercepts requests from the Web device for HTML V4 Web pages including CSS and that the device will be unable to interpret. The CSS proxy is in charge of collecting the HTML V4 pages requested and tailoring these pages applying as much presentation style as possible according to the device capabilities and the constraints of the network. For instance, a black & white Minitel cannot display colors but can make the text blinking. So, a 'red' attribute can be replaced by a 'blink' attribute. Then, the CSS proxy returns the tailored pages to the Web device.

The first logical block of the CSS proxy implements the function of preference aggregation (200). This block receives the requests from a Web device which contain in the header, for instance, the device identification. The network conveying the request being also identified (wireless network from a palm pilot etc . . . ), the preference aggregation function accesses information relating to the identified device and consolidates them with information about the network to prepare a 'Request rule list' which is a list of presentation attributes to be used for preparing presentation of Web pages for this device.

These information may be stored in repositories connected to the CSS compensation layer network component (170). These information are public information respectively made available by the Web device manufacturers and the network carriers. These information are always made available through the communication protocol in a keyword-value language.

Figure 4:
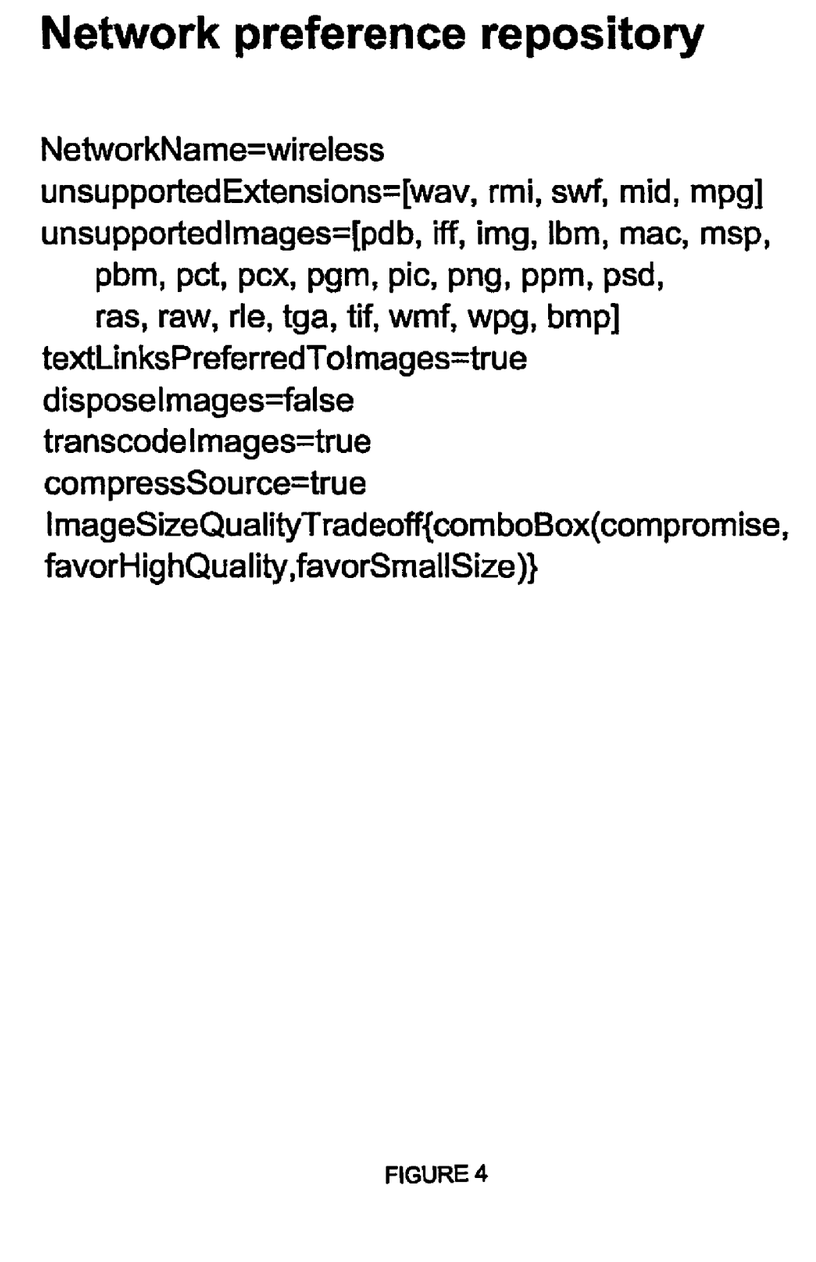
FIG. 4 is a sample of the Network preference repository.

FIG. 4 illustrates a network preference sample as stored in a corresponding repository (220) of the CSS proxy network component according to the preferred embodiment. These characteristics of the network represent the first constraints to apply to the rules of presentation. In this sample we have a wireless network ('NetworkName' keyword), unable to support mpg files ('unsupportedextension' keyword) and bmp file type images ('unsupportedimages' keyword). The network preference form the highest priority constraint when preparing the 'Request rule list' for this device.

Figure 5:
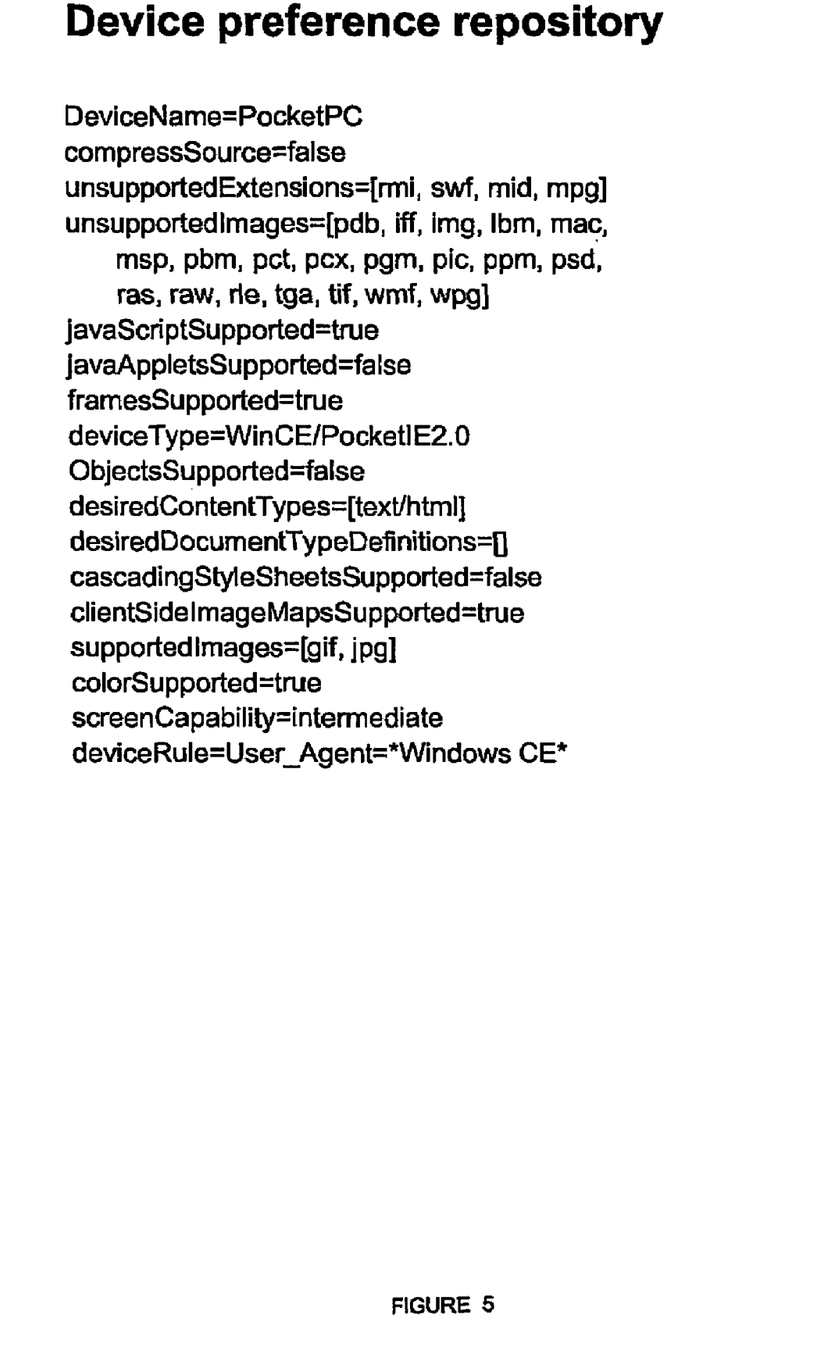
FIG. 5 is a sample of the Device preference repository.

FIG. 5 illustrates preference sample as stored in a corresponding repository (215) of the CSS proxy network component according to the preferred embodiment. The device preference sample describes the values of the configurable preferences for presentation which have been defined for this device at initialization. As the browser of the device supports HTML version up to 3.2, CSS is not supported and indicated with the keyword 'cascadingStyleSheetSupported' and set at 'false'. The supported images ('supportedImages' keyword) are gif and jpg, which sounds not contradictory with the network preferences as there are not part of the list of unsupported images ('unsupportedextension' keyword). The device preferences should be checked for compatibility with the network preferences which represent the highest priority criterion when preparing the 'Request rule list' for the device.

Figure 6:
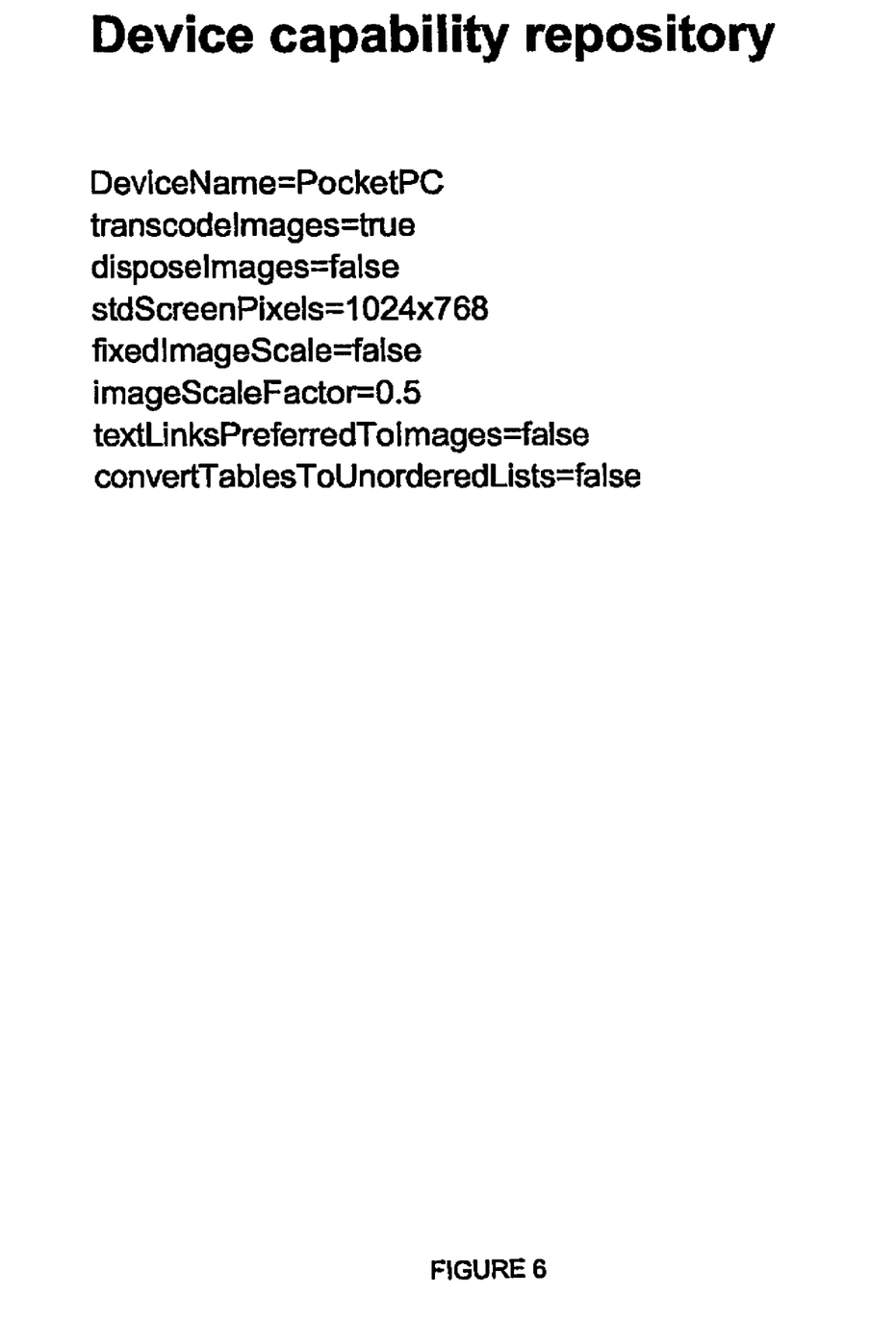
FIG. 6 is a sample of the Device capability repository.

FIG. 6 illustrates a device preference sample as stored in a corresponding repository (215) of the CSS proxy network component according to the preferred embodiment. Once the network preferences have been checked against the device preferences, the device capabilities are then considered to build the final 'Request rule list' for the device. In this sample the device is a Pocket PC. The device has certain capabilities which can be overwritten by the network constraints as previously analyzed.

Figure 7:
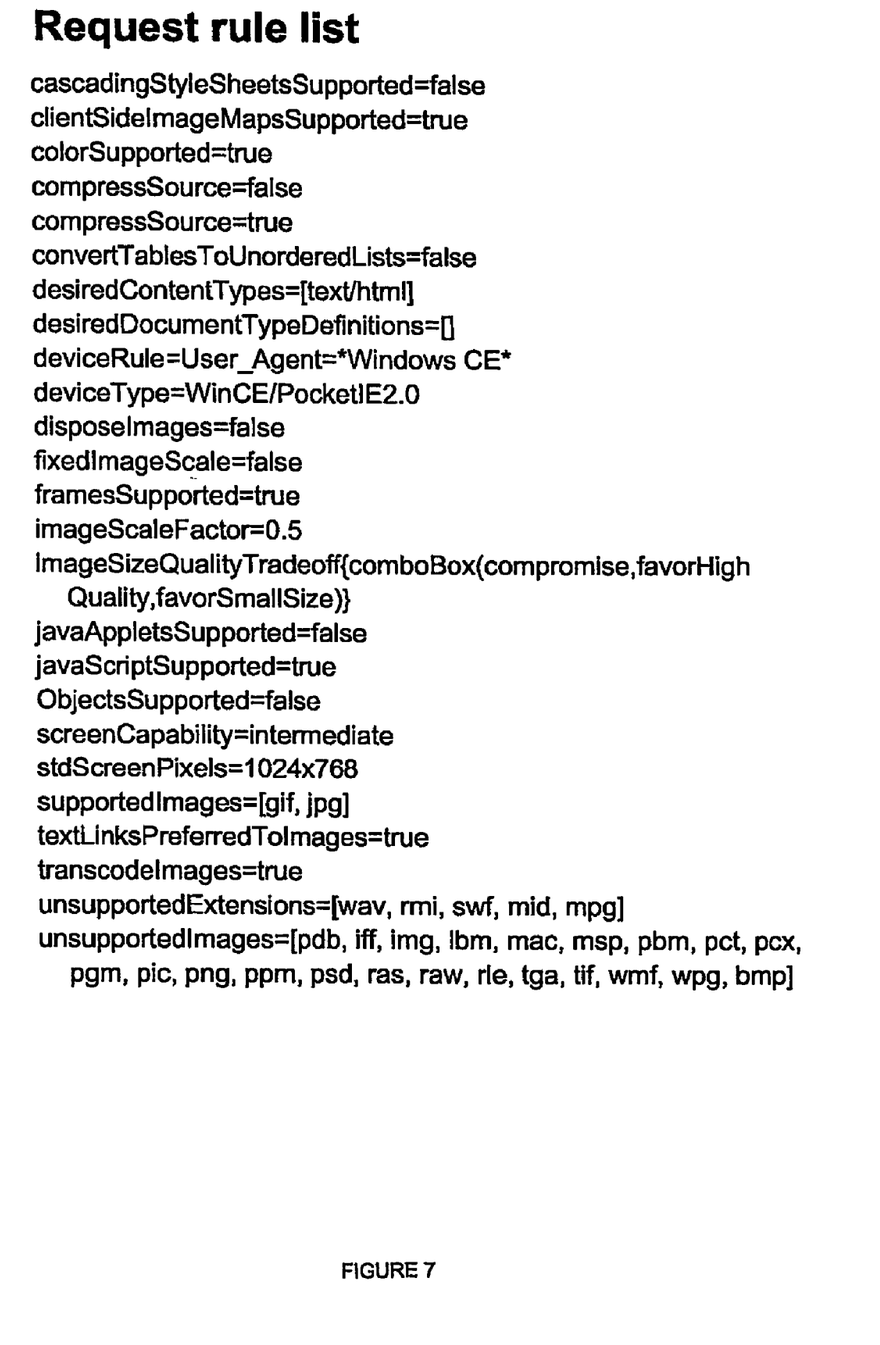
FIG. 7 is a sample of Request rule list for a wireless connected Pocket PC.

FIG. 7 illustrates the resulting Request rule list created for the device at the end of execution of the Preference aggregation logical block of the CSS proxy. In summary we obtain the list of FIG. 7 for preparing the presentation of Web pages answering a request having been sent by a Pocket PC connected in a wireless mode. We note, for instance that in the Request rule list, the device preference 'textLinksPreferredToImages=false' has been overwritten by the network constraint 'textLinksPreferredToImages=false' identified in the network preference sample.

Coming back to FIG. 2, the request processed by the Preference aggregation logical block is transferred to the Web server(s) (130) of which the address is included in the request of the device. However the request may be first transferred to a second logical block of the CSS proxy which is a Value added logical block (230). This block illustrated with dotted lines in FIG. 2 is optional, it is implemented for additional functions such as billing, security as required. Consequently, in an optional embodiment, on top of the CSS proxy function, other added value functions are implemented, optimizing the use of a CSS compensation layer network component (170) of operating environment of the solution according to the preferred embodiment.

The Web server(s) return(s) the requested page which may be in HTML V4 format. In this case, the CSS are either embedded in the HTML statements or, the Link statements of the HTML V4 page contains addresses pointing to CSS files. The HTML page is received in the CSS aggregation logical block which is not optional in the preferred embodiment. In the CSS aggregation logical block the CSS are retrieved and uniformized to create a CSS rule list which uniformizes all the CSS style definitions coming from all the retrieved CSS. The external CSS are retrieved from the CSS servers (160) or the Web servers themselves (130) and injected in a HTML page which is of level V3.2 as the presentation statements are mixed with other statements. However, during this operation, some contradictions may exist between the presentation statements coming from embedded CSS and external CSS. The conflicts are solved in this logical block in order to uniformize the page presentation. For instance, if in one embedded CSS we have:
H1 {color: #00ff00} and, in an external CSS (Link) is read:
H1 {color: #dda0dd},

The CSS aggregation logical block will only add H1 {color: #dda0dd} in the CSS rule list.

After execution of in the CSS aggregation logical block, a HTML page containing V3.2 statements is issued as well as the CSS rule list containing the list of the coherent style definitions extracted from all the retrieved CSS.

Optionally, the retrieved CSS can be stored in cache memory, the CSS cache (250), for improving the performance in processing the next page requests from the device.

In the last Transcoding logical block (260), are processed the inputs from the Preference aggregation logical block and the inputs from the CSS aggregation logical block. In the Preference aggregation logical block has been prepared the Request rule list and in the CSS aggregation logical block has been prepared, the HTML V3.2 statement page and a CSS rule list containing the style definitions for the page which have been retrieved from the CSS and uniformized. In the Transcoding logical block the inputs are processed and a tailored web page adapted to the device having sent the request is created and sent back to it (110). The inputs are processed in two steps. A first step consists in checking the CSS rule list with the Request rule list corresponding to this device and creating an action list comprising all the actions to perform on the HTML V3.2 page statements to introduce the CSS rule list while taking into account the Request rule list for the device. The second step consists in the Transcoding logical block in interpreting the actions and generate the new page statements. Finally, the CSS proxy has converted a HTML V4 page into a HTML V3.2 page in the following way: for each style in the CSS rule list, the CSS proxy has interpreted an equivalent style for the device as defined in his profile (Request rule list) and added a relevant attribute in the HTML tags of the HTML V4 page as it was done in HTML 3.2.

As a example, assuming that the HTML V3.2 page provided after execution of the CSS aggregation logical block is as follows:

```
<html>
<body>
<h1>This is header 1</h1>
<h2>This is header 2</h2>
<p>This is a paragraph</p>
</body>
</html>
```

Assuming also that the CSS rule list is as follows:
h1 {color: #00ff00}
h2 {color: #dda0dd}
p {color: rgb(0,0,255)}

If, from the Request rule list is known the fact that the device does not support color attribute, then the following action list is created in the Transcoding logical block:

| | | |
|---|---|---|
| Replace | <h1> by | <B> |
| Replace | <h2> by | <I> |

Which will be interpreted in the Transcoding logical block and the following HTML V3.2 page statements will be generated:

```
<html>
<body>
<h1><B>This is header 1</B></h1>
<h2><I>This is header 2<I></h2>
<p>This is a paragraph</p>
</body>
</html>
```

This tailored page will be then sent to the device.

Figure 3:
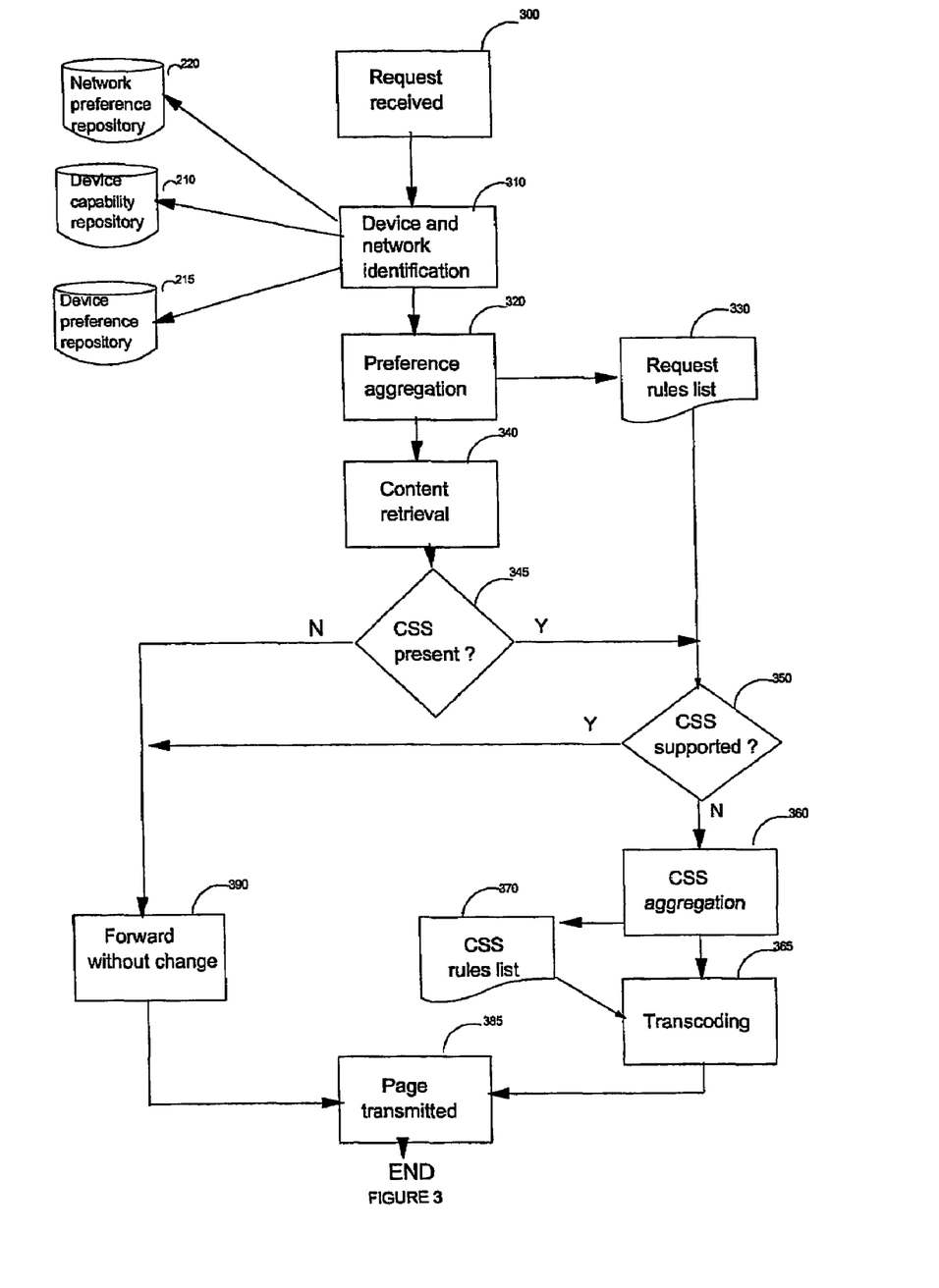
FIG. 3 is the general flow chart of the method according to the preferred embodiment.

FIG. 3 is the general flow chart of the method according to the preferred embodiment. In the first step, (300) a request, preferably under the HTTP or HTTPS protocol, at a computing location which is a network component such as a dedicated proxy server or a router with computing resources. The request is sent by a Web device of which the browser does not support CSS. In the second step (310) the device is identified: with HTTP and HTTP a header comprises a device identifier. The information stored in the device capability repository and device preference repository corresponding to that device are extracted. The network used by the device for sending the request is obtained from the computing system and by one among many possibilities well known in the art, and is used in this step to extract the corresponding network preference information from the network preference repository. The next step, (320), the preference aggregation is performed by building a list of selected information among all the extracted information. To build select the list items, the priority is given to the network preferences, which are validated against the device preferences and then, the last selection is performed with the device capabilities. At the and of the preference aggregation step, a Request rule list is completed. The next step consists in retrieving the Web page requested (340) from Web servers. If the Web page does not contain CSS (answer yes to test 345), the retrieved page is forwarded (390) through the other functions without any change and transmitted as is to the device. The browser device supporting up to HTML V3.2 will be able to interpret this page. If the retrieved page contain at least one CSS it is checked, in the Request rule list, if CSS is supported by the device. If the device supports CSS (answer yes to test 350), the retrieved page is forwarded (390) through the other functions without any change and transmitted as is to the device. The browser device supporting HTML V4 will be able to interpret the CSS style itself and use it to display the Web page. If the device does not support CSS (answer No to test 350), and it is the main case supported by the method of the preferred embodiment, the CSS are retrieved if necessary and aggregated. The CSS style definitions may be directly embedded in the HTML V4 statements of the page retrieved in the previous step. The other case is when the HTML page statements include Link statements. In this case, the CSS style definitions are retrieved from files located on the Web server(s) or on specific CSS servers. Once all the CSS style definitions of the HTML page are retrieved, the contradictory definitions are suppressed from the list, the resulting list forming a CSS rule list (370). This list, as well as, the retrieved HTML page are used as inputs to the next Transcoding step (365). In this step, the statements of the HTML page which are not related to CSS are modified to take into account the presentation style definitions of the CSS rule list but without being contradictory with the Request rule list for the device and network capabilities and preferences. The Transcoding step is, for reasons of performance, executed in the preferred embodiment in two steps: a first step for preparing a action list describing the modifications to bring to the remaining HTML statements and a second step interpreting these actions on the HTML statements. The resulting HTML statements form the final HTML page tailored for the device that is adapted to its presentation possibilities and containing only statements from HTML V3.2 that it can interpret to display the Web page.

The invention claimed is:

1. A computerized method for enabling a device using a web browser that does not support Cascading StyleSheets (CSS) to request a Web HyperText Markup Language (HTML) page that includes CSS through a network and a display, while using all presentation features of the included CSS that the web browser can support through the network, the method comprising:
   receiving a request from the device for obtaining the Web HTML page;
   forming a Request rule list by identifying the requesting device, aggregating all device and network display possibility information, and suppressing contradictory information, the network display possibilities having a highest priority;
   retrieving the requested Web HTML page from a Web server;
   aggregating all CSS presentation definitions of the Web HTML page while suppressing any conflicting CSS presentation definitions in a resulting CSS rule list;
   modifying any statement of the Web HTML page that is not related to CSS, each modified statement reflecting the CSS rule list while taking into account the device and network display possibilities as stated in the Request rule list;
   suppressing all statements of the Web HTML page that are related to CSS; and
   transmitting to the device the HTML page comprising the modified statements after the suppressing.

2. The method of claim 1, wherein the modifying includes:
   creating an action list of the modifications to bring to the Web HTML page that are not related to CSS; and
   interpreting these actions to create the modified statements.

3. The method of claim 1, wherein the aggregating all CSS presentation definitions includes:
   collecting the CSS presentation definitions embedded in the retrieved Web HTML page; and
   reading from a Web server, the address of which is provided in an HTML statement, the CSS presentation definitions included in a CSS file stored on the Web server.

4. The method of claim 3, further comprising storing the CSS file read from the Web server on a CSS cache file.

5. The method of claim 1, further comprising performing an added value function concerning activity of the device using the request from the device.

6. The method of claim 1, further comprising storing information on device capabilities, device preferences and network preferences in repositories, the aggregating all device and network preferences including reading the repositories.

7. A system for enabling a device using a web browser that does not support Cascading StyleSheets (CSS) to request a Web HyperText Markup Language (HTML) page that includes CSS through a network and a display, while using all presentation features of the included CSS that the web browser can support through the network, the system comprising:

a system for receiving a request from the device for obtaining the Web HTML page;
a system for forming a Request rule list by identifying the requesting device, aggregating all device and network display possibility information, and suppressing contradictory information, the network display possibilities having a highest priority;
a system for retrieving the requested Web HTML page from a Web server;
a system for aggregating all CSS presentation definitions of the Web HTML page while suppressing any conflicting CSS presentation definitions in a resulting CSS rule list;
a system for modifying any statement of the Web HTML page that is not related to CSS, each modified statement reflecting the CSS rule list while taking into account the device and network display possibilities as stated in the Request rule list;
a system for suppressing all statements of the Web HTML page that are related to CSS; and
a system for transmitting to the device the HTML page comprising the modified statements after the suppressing.

8. The system of claim 7, wherein the system for modifying includes:
a system for creating an action list of the modifications to bring to the Web HTML page that are not related to CSS; and
a system for interpreting these actions to create the modified statements.

9. The system of claim 7, wherein the system for aggregating all CSS presentation definitions includes:
a system for collecting the CSS presentation definitions embedded in the retrieved Web HTML page; and
a system for reading from a Web server, the address of which is provided in an HTML statement, the CSS presentation definitions included in a CSS file stored on the Web server.

10. The system of claim 9, further comprising a system for storing the CSS file read from the Web server on a CSS cache file.

11. The system of claim 7, further comprising a system for performing an added value function concerning activity of the device using the request from the device.

12. The system of claim 7, further comprising a system for storing information on device capabilities, device preferences and network preferences in repositories, the system for aggregating all device and network preferences including a system for reading the repositories.

13. A computer program product stored on a computer-readable medium for enabling a device using a web browser that does not support Cascading StyleSheets (CSS) to request a Web HyperText Markup Language (HTML) page that includes CSS through a network and a display, while using all presentation features of the included CSS that the web browser can support through the network, the computer program product comprising program code for enabling a computer to:
receive a request from the device for obtaining the Web HTML page;
form a Request rule list by identifying the requesting device, aggregating all device and network display possibility information, and suppressing contradictory information, the network display possibilities having a highest priority;
retrieve the requested Web HTML page from a Web server;
aggregate all CSS presentation definitions of the Web HTML page while suppressing any conflicting CSS presentation definitions in a resulting CSS rule list;
modify any statement of the Web HTML page that is not related to CSS, each modified statement reflecting the CSS rule list while taking into account the device and network display possibilities as stated in the Request rule list;
suppress all statements of the Web HTML page that are related to CSS; and
transmit to the device the HTML page comprising the modified statements after the suppressing.

14. The program product of claim 13, wherein the program code for enabling a computer to modify includes program code for enabling a computer to:
create an action list of the modifications to bring to the Web HTML page that are not related to CSS; and
interpret these actions to create the modified statements.

15. The program product of claim 13, wherein the program code for enabling a computer to aggregate all CSS presentation definitions includes program code for enabling a computer to:
collect the CSS presentation definitions embedded in the retrieved Web HTML page; and
read from a Web server, the address of which is provided in an HTML statement, the CSS presentation definitions included in a CSS file stored on the Web server.

16. The program product of claim 13, further comprising program code for enabling a computer to perform an added value function concerning activity of the device using the request from the device.

17. The program product of claim 13, further comprising program code for enabling a computer to store information on device capabilities, device preferences and network preferences in repositories, the program code for enabling a computer to aggregate all device and network preferences including program code for enabling a computer to read the repositories.

* * * * *

UNITED STATES PATENT AND TRADEMARK OFFICE
CERTIFICATE OF CORRECTION

PATENT NO.       : 7,620,891 B2                                              Page 1 of 1
APPLICATION NO. : 10/562020
DATED            : November 17, 2009
INVENTOR(S)      : Aubert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Twenty-sixth Day of October, 2010

David J. Kappos
*Director of the United States Patent and Trademark Office*